United States Patent
Schmitz

(12) 
(10) Patent No.: US 6,227,221 B1
(45) Date of Patent: May 8, 2001

(54) SINGLE-FLUID APPARATUS FOR SUPPLYING VEHICLE POWER AND LUBRICATION FLUID REQUIREMENTS AND A SYSTEM AND METHOD FOR FLUID DISTRIBUTION AND DELIVERY

(76) Inventor: Geoffrey W. Schmitz, 413 Lasalle St., Wausau, WI (US) 54403

( * ) Notice: Subject to any disclaimer, the term of this patent is extended or adjusted under 35 U.S.C. 154(b) by 0 days.

(21) Appl. No.: 09/678,905

(22) Filed: Oct. 4, 2000

(51) Int. Cl.⁷ ................................................ F16D 31/02
(52) U.S. Cl. ..................... 137/1; 137/549; 137/550; 137/552; 137/574; 137/592; 60/453
(58) Field of Search .................... 137/574, 552, 137/549, 550, 1

(56) References Cited

U.S. PATENT DOCUMENTS

| | | | |
|---|---|---|---|
| 2,500,627 | 3/1950 | Chinn | 137/153 |
| 2,585,348 | 2/1952 | Robinson | 60/52 |
| 2,764,177 * | 9/1956 | Paasche | 137/552 |
| 3,073,123 | 1/1963 | Hodgson et al. | 60/53 |
| 3,197,960 | 8/1965 | Forster | 60/52 |
| 3,321,056 | 5/1967 | Winchell et al. | 192/85 |
| 3,470,693 | 10/1969 | Bookout et al. | 60/52 |
| 3,641,879 | 2/1972 | Week et al. | 91/412 |
| 3,664,129 | 5/1972 | Schwab | 60/53 |
| 3,993,094 * | 11/1976 | Spooner | 137/574 |
| 4,005,636 | 2/1977 | Dunn | 91/31 |
| 4,043,419 | 8/1977 | Larson et al. | 180/132 |
| 4,075,840 | 2/1978 | Jesswein | 60/422 |
| 4,130,990 | 12/1978 | Amedei et al. | 60/422 |
| 4,144,946 | 3/1979 | Melocik | 180/132 |
| 4,174,018 | 11/1979 | Liebert et al. | 180/132 |
| 4,179,888 | 12/1979 | Goscenski, Jr. | 60/420 |
| 4,189,919 | 2/1980 | Goscenski, Jr. | 60/420 |
| 4,206,689 | 6/1980 | Peterson | 91/516 |
| 4,223,646 | 9/1980 | Kinder | 123/43.11 |
| 4,343,151 | 8/1982 | Lorimor | 60/422 |
| 4,410,058 | 10/1983 | Dymond | 180/143 |
| 4,414,809 | 11/1983 | Burris | 60/424 |
| 4,425,766 | 1/1984 | Claypole | 62/133 |
| 4,439,984 * | 4/1984 | Martin | 60/454 |
| 4,446,697 | 5/1984 | Goscenski, Jr. | 60/443 |
| 4,454,717 * | 6/1984 | Wade et al. | 60/453 |
| 4,738,330 | 4/1988 | Suzuki et al. | 180/141 |

(List continued on next page.)

OTHER PUBLICATIONS

"Mobil Delvac 1 High–Performance Synthetic, Heavy–Duty Diesel Engine Oil," Mobil Product Data Sheet, Mobil Oil Corporation, 1984–1999.

Buck, W.H. and Lohuis, J.R., "Lubricant Effects on Low-–Temperature Diesel Engine Cold Starting," SAE Technical Paper Series 940097, Feb. 1994.

Kennedy, S., Ragomo, M. W., Lohuis, J. R. and Richman, W. H., "A Syntheic Diesel Engine Oil with Extended Laboratory Test and Field Service Performance," SAE Technical Paper Series 952553, Oct. 1995.

Primary Examiner—A. Michael Chambers
(74) Attorney, Agent, or Firm—Patents +TMS

(57) ABSTRACT

A single-fluid, multiple-reservoir hydraulic system and a method and system for fluid distribution are provided. The single-fluid, multiple-reservoir hydraulic system utilizes a single-fluid to supply all vehicle power and lubrication fluid requirements. The hydraulic system combines separate fluid reservoirs and fluids into a single integrated system that services multiple systems without a need for multiple dedicated reservoirs. The hydraulic system maintains and prioritizes separate dedicated fluid reserves within one reservoir and may also reach and maintain consistent fluid temperature and viscosity. Consistent performance and extended component life are provided while maintaining circulation with the hydraulic system. In addition, the single fluid and single reservoir hydraulic system have a single fluid fill point, a common reservoir check point and fluid level monitor.

32 Claims, 10 Drawing Sheets

U.S. PATENT DOCUMENTS

| | | | |
|---|---|---|---|
| 4,794,883 | 1/1989 | Fukami et al. | 123/41 |
| 4,798,050 | 1/1989 | Nakamura et al. | 60/329 |
| 4,798,177 | 1/1989 | Oomura et al. | 123/41.12 |
| 5,241,823 | 9/1993 | Stone et al. | 60/487 |
| 5,535,845 | 7/1996 | Buschur | 180/417 |
| 5,561,978 | 10/1996 | Buschur | 60/424 |
| 5,669,461 | 9/1997 | Buschur | 180/417 |
| 5,687,568 | 11/1997 | Buschur | 60/424 |
| 5,778,693 | 7/1998 | Mientus | 62/181 |
| 5,875,630 | 3/1999 | Walsh et al. | 60/421 |
| 5,881,630 | 3/1999 | Buschur et al. | 91/516 |
| 5,946,911 | 9/1999 | Buschur et al. | 60/424 |
| 5,960,628 | 10/1999 | Machesney et al. | 60/424 |
| 5,975,233 | 9/1999 | Eisenbacher | 180/417 |
| 6,016,657 | 1/2000 | Buschur | 60/424 |
| 6,021,641 | 2/2000 | Buschur et al. | 60/425 |

\* cited by examiner

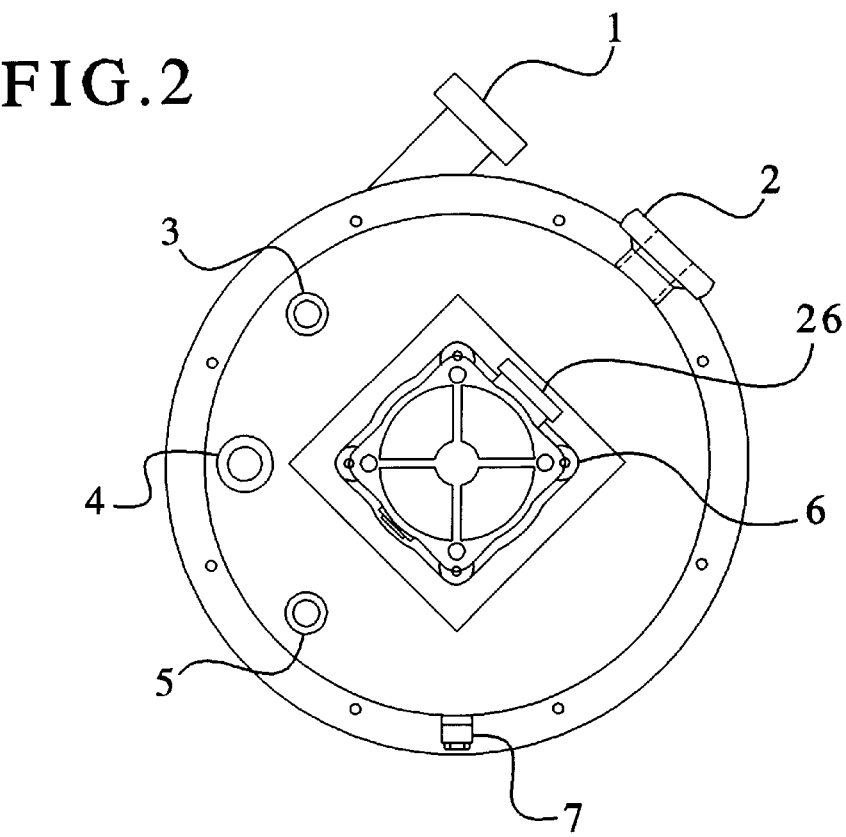
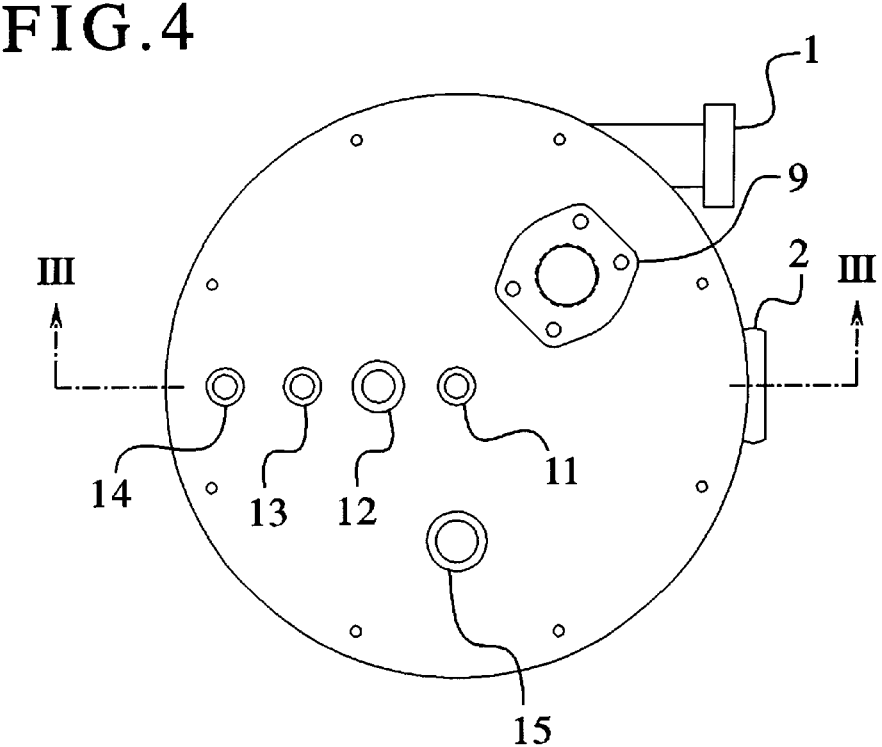

SINGLE-FLUID APPARATUS FOR SUPPLYING VEHICLE POWER AND LUBRICATION FLUID REQUIREMENTS AND A SYSTEM AND METHOD FOR FLUID DISTRIBUTION AND DELIVERY

BACKGROUND OF THE INVENTION

The present invention generally relates to a hydraulic system and method for fluid distribution that is low maintenance and utilizes a single-fluid to supply all vehicle power and lubrication fluid requirements. More specifically, the present invention relates to a fluid operating system able to maintain and prioritize separate dedicated fluid reserves within one reservoir. The fluid operating system is also able to reach and to maintain consistent fluid temperature and viscosity. As a result consistent performance and extended component life are achieved while maintaining circulation with the hydraulic system.

It is, of course, generally known that mobile and/or marine hydraulic systems commonly employ several different fluids with isolated reservoirs that do not carry recommended fluid reservoir volumes for industrial hydraulic systems. Reduced reservoir capacity results in high flow rates, rapid fluid breakdown, high temperatures, and fluid aeration.

In addition, operation of hydraulic systems in dirty, dusty, wet or otherwise contaminated environments results in water and dirt incursion requiring increased fluid filtration and resulting in system degradation. Multiple lubricants increase logistic requirements, complicate service and increase the potential for error. With separate reservoirs, each hydraulic circuit is limited to the qualities available within a given fluid system. Separate cooling circuits may be required for each fluid with increased complexity for multiple fan drives, heat exchangers, and the like.

It is generally known that reservoirs in hydraulic circuits are isolated and used to varying degrees. Thus, temperature and viscosity vary between the hydraulic circuits. In addition, special and costly fluids are often required to maintain acceptable fluid viscosity at low temperatures. Cold, high viscosity operating fluids detrimentally influence performance, increase wear and may result in shorter component life.

A need, therefore, exists for an apparatus, system and method that combine separate fluid reservoirs and fluids into a single integrated system that services multiple systems without a need for multiple dedicated reservoirs. In addition, a need exists for an apparatus, system and method having a single fluid fill point, a common reservoir check point and fluid level monitor to minimize the opportunities for contamination and simplify maintenance.

SUMMARY OF THE INVENTION

The present invention provides a single-fluid apparatus for supplying vehicle power and lubrication fluid requirements and a system and method for fluid distribution and delivery. The apparatus, system and method combine formerly separate fluid reservoirs and fluids into a single integrated system that services multiple systems without a need for multiple dedicated reservoirs.

To this end, in an embodiment of the present invention, an apparatus for a single fluid multiple-volume self-prioritized reservoir and a method and system for fluid distribution and delivery are provided. The apparatus for a single fluid multiple-volume self-prioritized reservoir (herein after "reservoir") has a container having a bottom and walls defining a volume and a plurality of partitions. Each partition has a top end and a bottom end. The bottom end of each of the plurality of partitions is attached to the bottom of the container, creating a plurality of volumes in the container. The reservoir has a plurality of outlet ports, where at least one of the plurality of outlet ports is located within each of the plurality of volumes. The reservoir also has a fluid inlet projecting into an innermost volume of the plurality of volumes.

In an embodiment, a fine mesh screen is provided and positioned over the top end of the plurality of partitions.

In an embodiment, a lid is fastened to the container.

In an embodiment, a return filter associated with the fluid inlet is provided.

In an embodiment, a level site-glass gage is installed in the wall of the container.

In an embodiment, an electronic level sensor is installed in the lid.

In an embodiment, a temperature sensor is installed on the container.

In an embodiment, a fluid is provided that flows into the container.

In an embodiment, a second priority volume surrounds a first priority volume and the second priority volume receives fluid from the first priority volume.

In an embodiment, a third priority volume receives fluid from a second priority volume and the fluid from the second volume passes over the top end of one of a plurality of partitions.

In an embodiment, a third-priority volume receives fluid from a second priority volume and the fluid from the second volume passes through a screen.

In an embodiment, a bottom plate with integral dividers is fastened to the bottom of the container.

In an embodiment, a filler-neck located over a return filter has a check valve to prevent fluid from passing through the filler-neck.

In an embodiment, fluid may be added to the container by removal of a filler cap located above a filler-neck.

In another embodiment of the present invention, a system for distribution and delivery of a fluid is provided. The system has a reservoir having a bottom, a volume, and a lid. The lid is fastened to the container. The system also has a plurality of partitions each having a bottom end attached to the bottom of the reservoir and each having a top end. A plurality of volumes are created by the division of the volume of the reservoir by the plurality of partitions. The system also has a plurality of outlet ports within each of the plurality of volumes, a fluid inlet that projects into an innermost volume of the plurality of volumes, and a plurality of drains that are located in the bottom of the container within each of the plurality of volumes.

In an embodiment, a screening means is provided over the top end of the plurality of partitions at a plurality of outlet ports or other location.

In an embodiment, fluid is filtered and directed into the inner most volume of the reservoir.

In an embodiment, a filler-neck is located over a return filter that contains a check valve. The check valve prevents the fluid from passing upward through the filler-neck, thereby preventing contamination of the fluid.

In an embodiment, mixing of a fluid is provided when a second priority volume, that is located around a first-priority volume, receives fluid from the first priority volume and when a third-priority volume receives fluid from the second priority volume.

In an embodiment, distribution of fluid is provided by a first priority circuit receiving fluid from a first priority volume and a second priority circuit receiving fluid from a second priority volume and a third priority circuit receiving fluid from a third priority volume.

In an embodiment, fluid is recovered and returned to the reservoir.

In another embodiment of the present invention, a method for distribution and delivery of a fluid is provided. The method comprises the steps of: providing a reservoir having a bottom and walls defining a volume; providing a plurality of partitions having a top end and a bottom end wherein the bottom end is attached to the bottom of the reservoir; creating a plurality of volumes by the division of the volume of the reservoir by the plurality of partitions; providing a plurality of outlet ports within each of the plurality of volumes; providing a fluid inlet projecting into an innermost volume of the plurality of volumes; and providing a plurality of drains wherein at least one of the plurality of drains is located within each of the plurality of volumes.

In an embodiment, the step of screening fluid within a reservoir is provided.

In an embodiment, fluid is filtered into the inner most volume of the reservoir.

In an embodiment, the level of the fluid is remotely monitored.

In an embodiment, the fluid temperature is measured.

In an embodiment, fluid is introduced into the reservoir through the inlet.

In an embodiment, fluid contamination is prevented at the inlet to the reservoir by using a check valve. The check valve prevents the fluid from passing upward.

In an embodiment, the fluid is mixed and entrained air is removed by centrifugal flow.

In an embodiment, the fluid is mixed and entrained air is removed by fluid flow as a second-priority volume surrounding a first-priority volume receives the fluid from the first priority volume and as a third-priority volume receives fluid that flows over a partition between the second priority volume and the third priority volume.

In an embodiment, fluid is distributed to a first priority circuit from a first priority volume and to a second priority circuit from a second priority volume and further to a third priority circuit from a third priority volume.

In an embodiment, fluid is recovered and returned to the reservoir.

It is therefore, an advantage of the present invention to provide a single-fluid apparatus for supplying vehicle power and lubrication fluid requirements for hydraulic systems and a system and method for fluid distribution and delivery.

A further advantage of the present invention is to provide a single-fluid hydraulic system extendible to all existing, and future mobile fluid power and lubrication requirements given a common compatible operating fluid. The single-fluid hydraulic system may minimize the need for multiple lubricants and/or operating fluids. The single-fluid hydraulic system may combine formerly separate fluid reservoirs and fluids into a single integrated system.

A still further advantage of the present invention is to provide a single reservoir and/or integrated constituent reservoirs able to service multiple systems without a need for multiple dedicated reservoirs.

And, another advantage of the present invention is to provide a single-fluid fill point to minimize the opportunities for contamination, simplify maintenance, and improve readiness.

A still further of the present invention is to provide a single-fluid, common reservoir check point and/or fluid level monitor for multiple integrated systems. The reservoir fluid level for multiple systems may be checked at a single location.

And, another advantage of the present invention is to provide a fluid distribution system including a hydrostatic pump serving as a vehicle retarder and/or primary and/or auxiliary hydraulic power supply and/or a heater able to convert mechanical energy directly into fluid heat.

Moreover, an advantage of the present invention is to raise and/or maintain consistent temperature and viscosity in fluid systems sharing a common fluid, and fluid reservoir and distribution means. In addition, the present invention may heat the hydraulic system, heat the engine during cold temperature start-up, maintain temperature in an operation that is to provide a "forced" warm-up, maintain acceptable engine, and/or maintain hydraulic and lubrication system operating temperature.

And, another advantage of the present invention is to provide a main pump that may apply all or part of many of the different below stated functions. For example, an application may use the retarder function without the auxiliary hydraulic supply function, yet retain the rapid warm-up function. Main pump functions are not mutually required and/or exclusive.

A still further advantage of the present invention is to provide a fluid system integrated with an automatic or power-shift transmission with or without a torque converter that shares a common lubrication, and/or operating fluid, fluid reservoir and distribution means.

Yet another advantage of the present invention is to provide a fluid system operating with a primary and/or secondary power-steering system sharing a common lubrication, and/or operating fluid, fluid reservoir and distribution means.

A still further advantage of the present invention is to provide a fluid system operating with ancillary and/or auxiliary fluid power and/or lubrication systems sharing a common lubricating, and/or operating fluid, fluid reservoir and distribution means.

And, another advantage of the present invention is to provide a fluid system operating with a hydrostatic and/or hydrodynamic retarder sharing a common lubrication, and/or operating fluid, fluid reservoir and distribution means.

Moreover, an advantage of the present invention is to provide a fluid system operating with auxiliary hydraulic systems including but not limited to hydraulic motors, hydraulic cylinders and rotary actuators sharing a common lubrication, and/or operating fluid, fluid reservoir and distribution means. Examples of such auxiliary systems include cranes, winches, load-handling-systems, auxiliary propulsion, hydraulic suspensions, pumps, generators, compressors, hydrostatic propulsion and others.

And, another advantage of the present invention is to provide a fluid system operating with a hydraulic-powered cooling fan sharing a common lubrication, and/or operating fluid, fluid reservoir and distribution means. Well known hydraulic controls provide single speed, two speeds, multiple speeds and/or proportional speed fan control. The fan operation may be linked to the engine, transmission control system ECU, pneumatic fan control, and/or mechanical fan control or other signal provided to modulate fan operation.

A still further advantage of the present invention is to provide a single-fluid supply reservoir containing isolated, yet common reservoir compartments, where circulation exists between reservoir compartments yet maintains dedicated volumes to supply given systems. The single-fluid hydraulic reservoir may be able to provide a dedicated secondary internal fluid reservoir, yet utilize the fluid capacity of the larger reservoir.

And, another advantage of the present invention is to provide a common fluid operating system and reservoir able to warm and distribute fluid to vehicle hydraulic and/or lubrication systems at start-up and/or during operation. The common fluid operating system and reservoir may be provided to maintain consistent fluid temperature and viscosity and subsequently to maintain consistent fluid characteristics through the utilization of a common heat exchanger for multiple systems. The single-fluid distribution method may service multiple systems with a common heat exchanger eliminating the need for multiple dedicated heat exchangers.

Moreover, an advantage of the present invention is to provide a common fluid operating system and reservoir to warm and distribute fluid to vehicle hydraulic and/or lubrication systems at start-up and/or during operation. The common fluid operating system and reservoir may provide consistent fluid temperature and viscosity and subsequently maintain consistent fluid characteristics through the utilization of a common liquid-to-liquid heat-exchanger, where liquid coolant circulates through the engine cooling system and the common heat exchanger. Hydraulic operating fluid circulates through the common heat exchanger and the hydraulic/lubrication system. Heat may be exchanged from the operating fluid to the liquid-coolant, from the liquid-coolant to the operating fluid or exchange no heat at all dependent on the temperature gradient across the heat exchanger. Operating fluid and liquid-coolant temperatures may be regulated by the engine cooling system. That is, the hydraulic system temperature regulation is integral with the engine coolant temperature control. Before the engine thermostats open, engine coolant is circulated by the engine water-pump through the heat exchanger and engine coolant passages until the coolant temperature is high enough to open the engine thermostats permitting the engine coolant to circulate primary flow through the primary heat exchanger to the water-pump. From the water pump, the primary flow circulates through the heat exchanger, through the engine coolant passages, through the engine primary heat exchanger and back to the water-pump. Operating fluid temperatures higher than the engine coolant temperature causes heat to transfer from the fluid to the engine coolant. Operating coolant temperatures higher than fluid temperatures causes heat to transfer to the operating fluid. Hydraulic and lubricating fluid temperatures are maintained consistent with the engine coolant temperature. The engine and hydraulic system warm-up are rapid and simultaneous. An optional thermostatic bypass valve permits fluid to bypass the cooler during start-up in extreme cold temperatures to avoid high flow restriction and pressure.

And, another advantage of the present invention is to provide a common fluid reservoir incorporating mechanisms to remove air entrained in the operating fluid including, but not limited to, forced fluid mixing, subsequent mixing, passing fluid over sharp partition edges, passing fluid through a fine mesh screen, placing inlets and/or outlets tangential to the reservoir body to induce centrifugal fluid motion resulting in water and/or air separation. The forced fluid mixing may be due to the return filter outlet placed inside the first priority fluid partition.

A still further advantage of the present invention is to provide a common fluid operating system returning fluid to the reservoir through a common filter to eliminate reservoir contamination from individual or multiple systems. Additionally, a common return filter eliminates the need for multiple dedicated system filters.

And, another advantage of the present invention is to provide a common fluid operating system where consistent fluid viscosity is maintained through a consistent fluid temperature and mixing. Consistent fluid temperature and viscosity improve equipment performance. For example, the transmission and torque converter in an automatic transmission results in more consistent shifts, and power-steering systems behave more consistently with correct and consistent fluid temperature and viscosity.

And, another advantage of the present invention is to provide a single-fluid operating system fostering the elimination of water from the operating fluid where desirable hydraulic operating temperatures sufficient to remove entrained water is quickly reached and/or maintained.

A still further advantage of the present invention is to provide a single-fluid, common operating system where sharing a single larger fluid volume results in longer fluid life, larger heat capacity than dedicated systems employing multiple smaller reservoir capacities.

And, another advantage of the present invention is to provide a common fluid distribution system where a consistent operating temperature, engine coolant temperature regulation, and forced heating (rapid warm-up) may permit utilizing a given operating fluid at below normally recommended operating temperatures.

A still further advantage of the present invention is to provide a common fluid operating system where compatible fluid may be delivered to non-shared systems or reservoirs. For example, the engine crankcase may be "topped-off" from the common fluid supply without return circulation from the engine to the common reservoir or fluid system. The "top-off" may be accomplished manually through an operator opening a valve or closing a switch or automatically, such as from a command from the engine or other electronic control unit signaling a solenoid valve.

And, another advantage of the present invention is to provide a single-fluid multiple chamber reservoir to maintain a higher fluid level for selected systems as required, even though a second or multiple fluid level may decrease during use of fluid consuming ancillary hydraulic systems, or due to "drain-back" at system shut down.

A still further advantage of the present invention is to provide a single-fluid reservoir where an optional reservoir fill provision permits replenishing the reservoir though the common return filter. The fill-cap may be open during system operation. A check valve located in the filler neck prevents flow through the neck during system operation while permitting fluid addition when idle. Forcing all new fluid through a primary filter eliminates contamination risk associated with unfiltered fluid addition. Optionally, the single fluid system may be replenished through a filtered and/or unfiltered port at the reservoir and/or at a point remote from the reservoir, such as by adding fluid to the transmission sump.

And, another advantage of the present invention is to provide a single-fluid reservoir characteristic applicable to hydraulic reservoirs with other than a cylindrical shape, including but not limited to spherical, square, rectangular and oval shapes. In addition, the single-fluid reservoir characteristics include the use of integral reservoirs within systems housings including, but not limited to: transmissions, transfer cases, axle housings, differential housings, torque converter, hollow frame members and vehicle components. Additionally, the single-fluid reservoir characteristics include finned, fluted or otherwise treated reservoir structure and/or material selection to increase or reduce heat transfer.

A still further advantage of the present invention is to provide filter elements including but not limited to well known conventional porous filter elements and/or well known mechanical fluid treatments including, but not limited to centrifuge separators, CUNI type filters, and permanent filters that may be cleaned and that are integral to and/or remotely mounted to the single-fluid reservoir.

And, another advantage of the present invention is to provide a single-fluid system not limited to operation with piston driven internal combustion Diesel or Otto cycle engines that may be employed in conjunction with other power-plants. The other power-plants may include gas turbines, jet engines, sterling cycle engines, crude-oil engines, multi-fuel engines, electric motors, hybrid systems such as diesel or electric, gas turbine/electric poser plants, nuclear fission, reciprocating steam engines, steam engines and others.

And, another advantage of the present invention is to provide specific location, size, orientation of inlet and outlet ports to the single-fluid reservoir based on the given application, excepting the primary inlet port required for common system filtration.

A still further advantage of the present invention is to provide a hydraulic system able to employ operating fluids such as motor oils, multi-viscosity motor oils, synthetic motor oils, hydraulic fluid, synthetic hydraulic fluids, blended fluids and others, optionally without special adjustment and/or modification.

And, another advantage of the present invention is to provide a single-fluid hydraulic system where the use of hydraulic common fluid filtration provides absolute hydraulic high performance filtration of all common fluid systems.

And, another advantage of the present invention is to provide a single-fluid hydraulic system with a multi-purpose main hydraulic pump to operate as a variable and/or fixed pressure, variable and/or fixed volume auxiliary hydraulic supply.

A still further advantage of the present invention is to provide a single-fluid hydraulic system with a multi-purpose main hydraulic pump to operate as a fixed or proportional system fluid heater, converting mechanical energy into heat rejected to the operating fluid.

And, another advantage of the present invention is to provide a single-fluid hydraulic system that may be employed in a new design and/or upgrade of existing designs and/or retrofitted to existing equipment.

And, another advantage of the present invention is to provide a hydraulic system integrating a "dry-sump" transmission where a fluid level is not maintained in the transmission housing. Dry sump transmissions do not churn sump fluid resulting in reduced transmission heat rejection and/or fluid aeration.

A still further advantage of the present invention is to provide a mobile hydraulic system including a proportional pressure and flow-compensated hydraulic pump acting as a vehicle retarder driven at the engine, to absorb power from the vehicle power-train to decelerate vehicle motion in lieu of, or in concert with, other retarding or braking systems.

And, another advantage of the present invention is to provide a hydrostatic retarder independent of a single-fluid hydraulic system. That is, the hydrostatic retarder is applicable to vehicle systems without a single-fluid distribution system. The retarder may be driven at the engine, and/or torque converter, and/or transmission, and/or transfer case, and/or auxiliary transmission, and/or axles, and/or drive and/or any other torque carrying drive-train and/or power-train component.

A still further advantage of the present invention is to provide an integral single-fluid hydraulic system to simultaneously supply operating fluid to single and multiple axle, and/or articulated frame steering and/or other steering hydraulic power-steering circuits.

Additional features and advantages of the present invention are described in, and will be apparent from, the detailed description of the presently preferred embodiments and from the drawings.

BRIEF DESCRIPTION OF THE DRAWINGS

FIG. 2 generally illustrates a top view of a dome lid of the single fluid, multiple-volume, self-prioritized reservoir.

FIGS. 5A and 5B illustrate a flowchart of an embodiment of a method for the fluid distribution and delivery system of the present invention.

DETAILED DESCRIPTION OF THE PRESENTLY PREFERRED EMBODIMENTS

The present invention provides a single fluid, multiple-volume, self-prioritized reservoir apparatus for supplying all vehicle power and lubrication fluid requirements for a mobile hydraulic system. More specifically, the present invention relates to a fluid operating system for maintaining and prioritizing separate dedicated fluid reserves within one reservoir and for quickly reaching and maintaining consistent fluid temperature and viscosity while maintaining circulation with the remainder of the hydraulic system. In addition, the present invention provides a system and a method for fluid distribution and delivery. Further, the present invention performs eight primary functions: stores fluid, prioritizes fluid delivery, removes fluid entrained air and vents to the atmosphere, supplies operating fluid to the hydraulic system, receives returning fluid from the hydraulic system, filters returning fluid, filters new or "top off" fluid and mixes fluid from the supplying systems.

Figure 1:
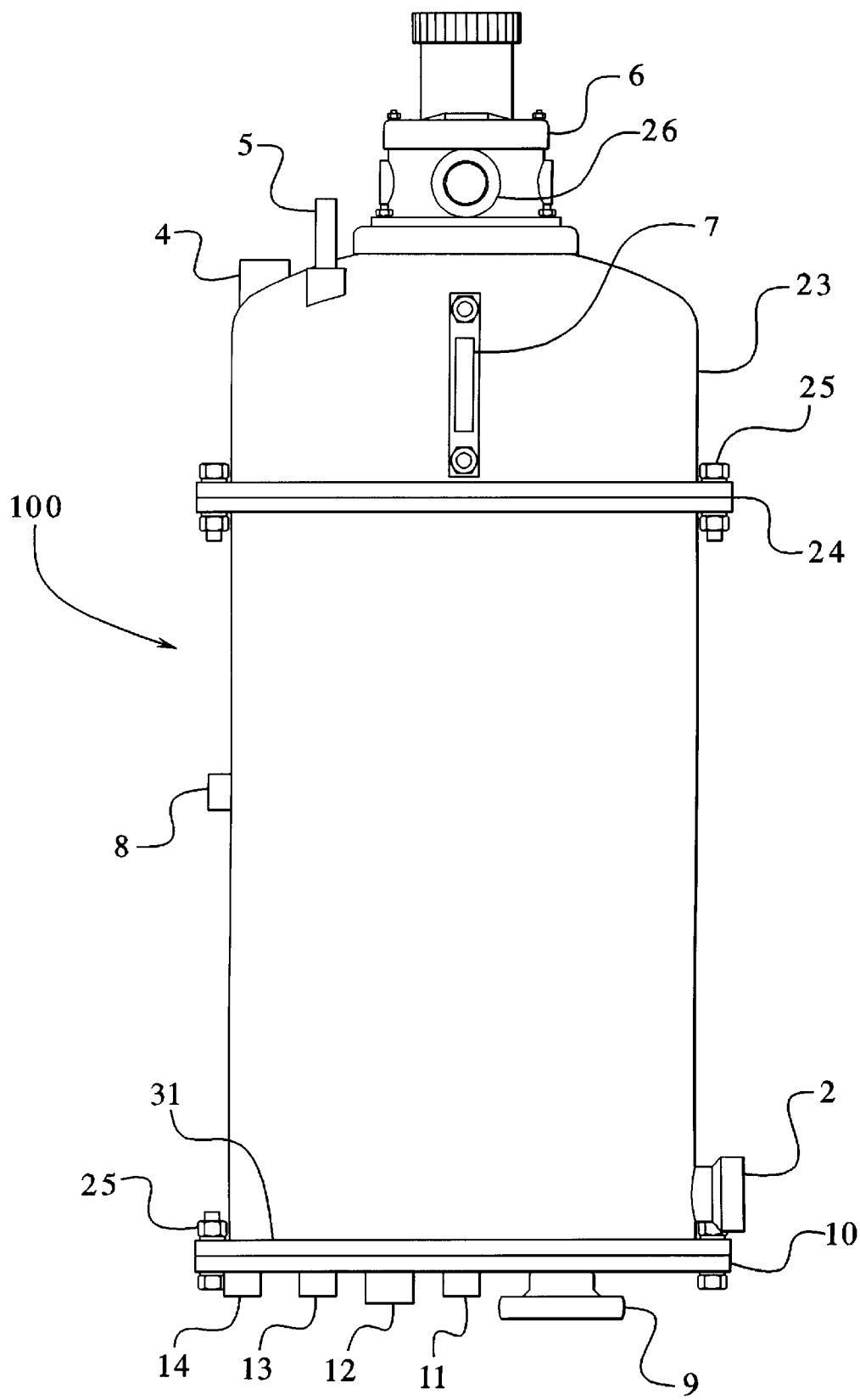
FIG. 1 generally illustrates a side view of a single fluid, multiple-volume, self-prioritized reservoir in an embodiment of the present invention.
Figure 3:
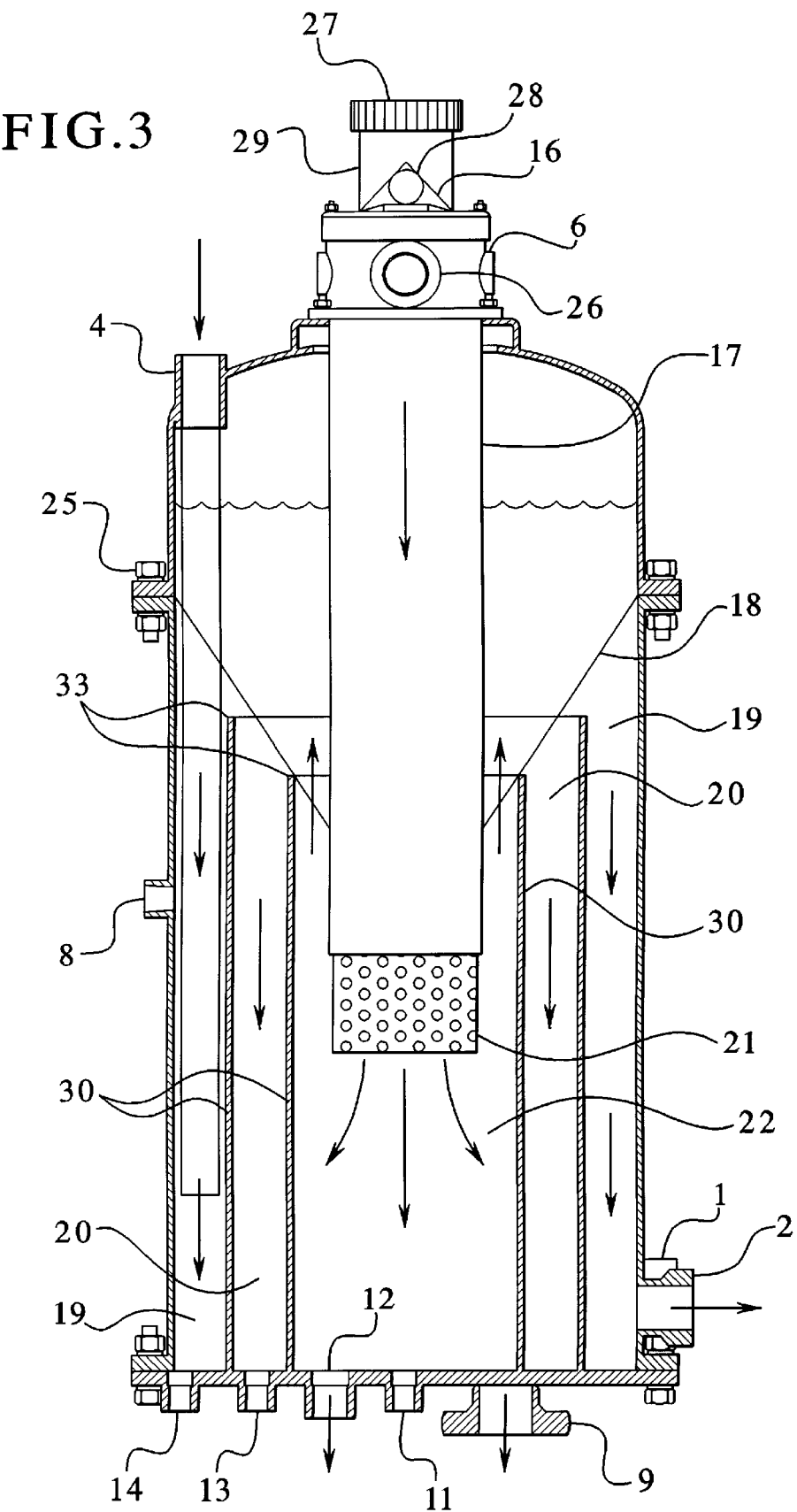
FIG. 3 generally illustrates a cross-sectional view taken along line III—III of FIG. 4 of an embodiment of the single fluid, multiple-volume, self-prioritized reservoir of the present invention.
Figure 4:
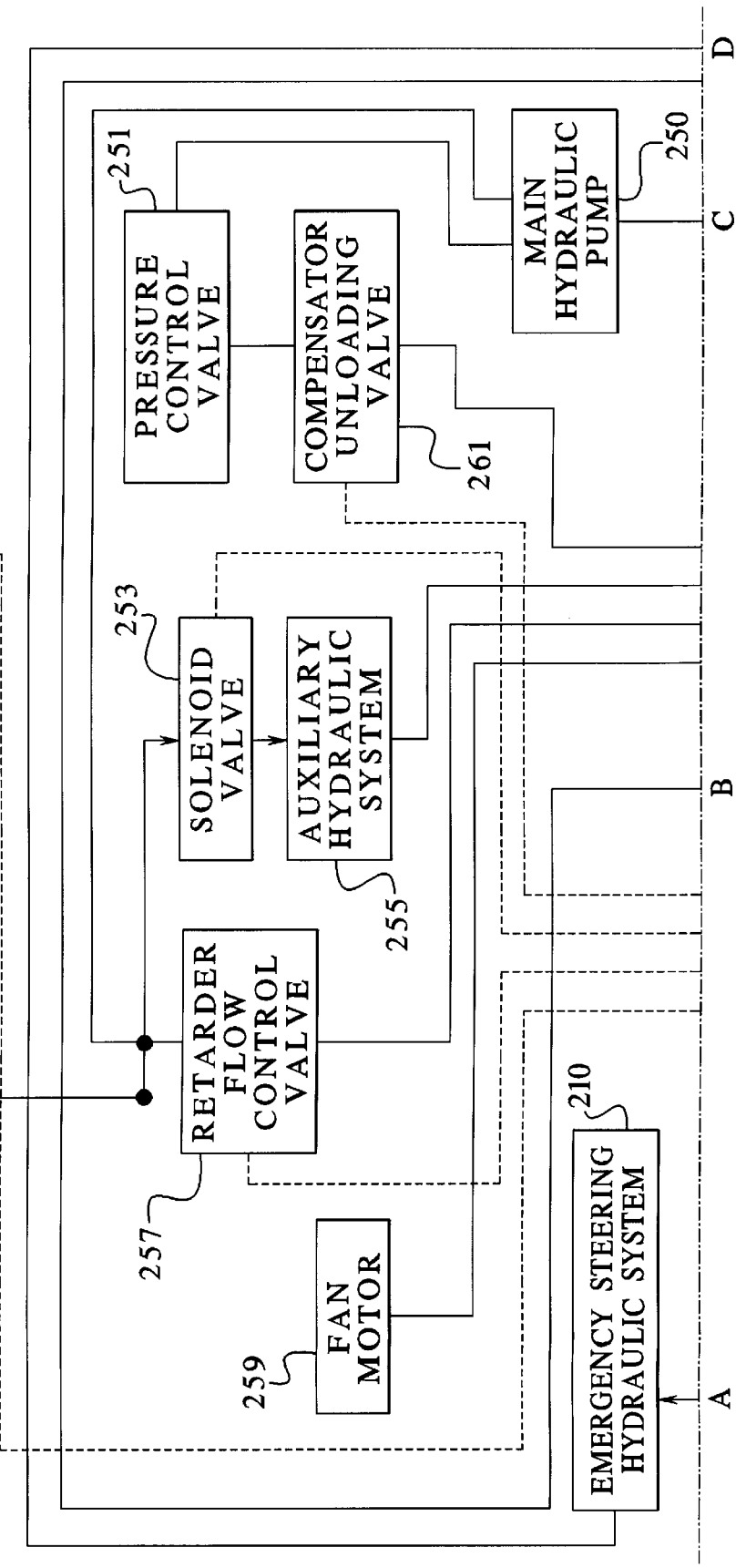
FIG. 4 generally illustrates a bottom view of the single fluid, multiple-volume, self-prioritized reservoir in an embodiment of the present invention.

Referring now to the drawings wherein like numerals refer to like parts, FIG. 1 generally illustrates a single fluid, multiple-volume, self-prioritized reservoir 100 (hereinafter "reservoir 100"), and FIG. 3 generally illustrates a vertical cross-section of the reservoir 100 taken generally along the line III—III of FIG. 1. FIGS. 2 and 4 generally illustrate the top and bottom view of the reservoir 100, respectively.

The reservoir 100 preferably contains two or more volumes formed by internal partitions 30. In this embodiment, two concentric circular partitions 30 may form three distinct volumes, namely volume 22, volume 20, and volume 19. The partitions 30 may be of equal or varying heights and are preferably sealed to a bottom 31 of the reservoir 100. A top end 33 of the partitions 30 are preferably left unattached to the reservoir 100. Fluid between the partitions 30, may therefore, mix and flow between the volumes 19, 20, and 22 as well as above the partitions 30 of the reservoir 100.

A fluid inlet 26 may be formed with a return filter 21 projecting into the innermost volume 22. In this embodiment, a filter (such as Model TTF-300-M32600 manufactured by Fairey Arron Incorporated, Sturtevant, Wisconsin) may be used. A non-permeable sleeve 17 may be installed around the diameter of the return filter 21. The return filter 21 directs fluid flow into the innermost volume, volume 22. An optional unfiltered inlet (not illustrated) may be provided to accept flow without filter restriction.

The reservoir 100 may be equipped with a filler-neck 29 and a filler neck cap 27 over the return filter 21 located on the dome lid 23 of the reservoir 100. The filler-neck 29 may contain a check valve 28 to prevent fluid from passing upward through the filler neck 29 when pressurized fluid is present and/or the filler-neck cap 27 is removed. Fluid may be added to the reservoir 100 through the inlet 26 in the filler-neck 29 to remove contaminants.

Fluid may flow into the reservoir 100 via the inlet 26 through the filter 21 into the volume 22. The volume 20 receives the fluid that overflows the volume 22. The volume 19 may receive fluid that overflows the volume 20. As fluid rises over the partitions 30, fluid may overflow the volume 20 and/or the volume 22.

A fine screen mesh 18 preferably may be placed over the volumes 19, 20, and 22. The fine screen mesh 18 may preferably take the shape of a cone as shown in FIG. 3 or any other geometric shape. The fine mesh screen 18 may be positioned over the volumes 19, 20, and 22, at outlet ports 1, 2, 9, 12, 15 or other locations.

Forced mixing of the fluid and/or cascading of the fluid from one volume to another and/or passing fluid over the partitions 30 and/or passing through the fine screen mesh 18 may serve to remove entrained air from the fluid. In addition, the outlet ports 1 and 2 may be positioned tangentially to the reservoir 100 to promote centrifugal fluid flow. Centrifugal fluid flow may assist in removing air and water contaminants and may be required to direct fluid from the reservoir 100.

Figure 5:
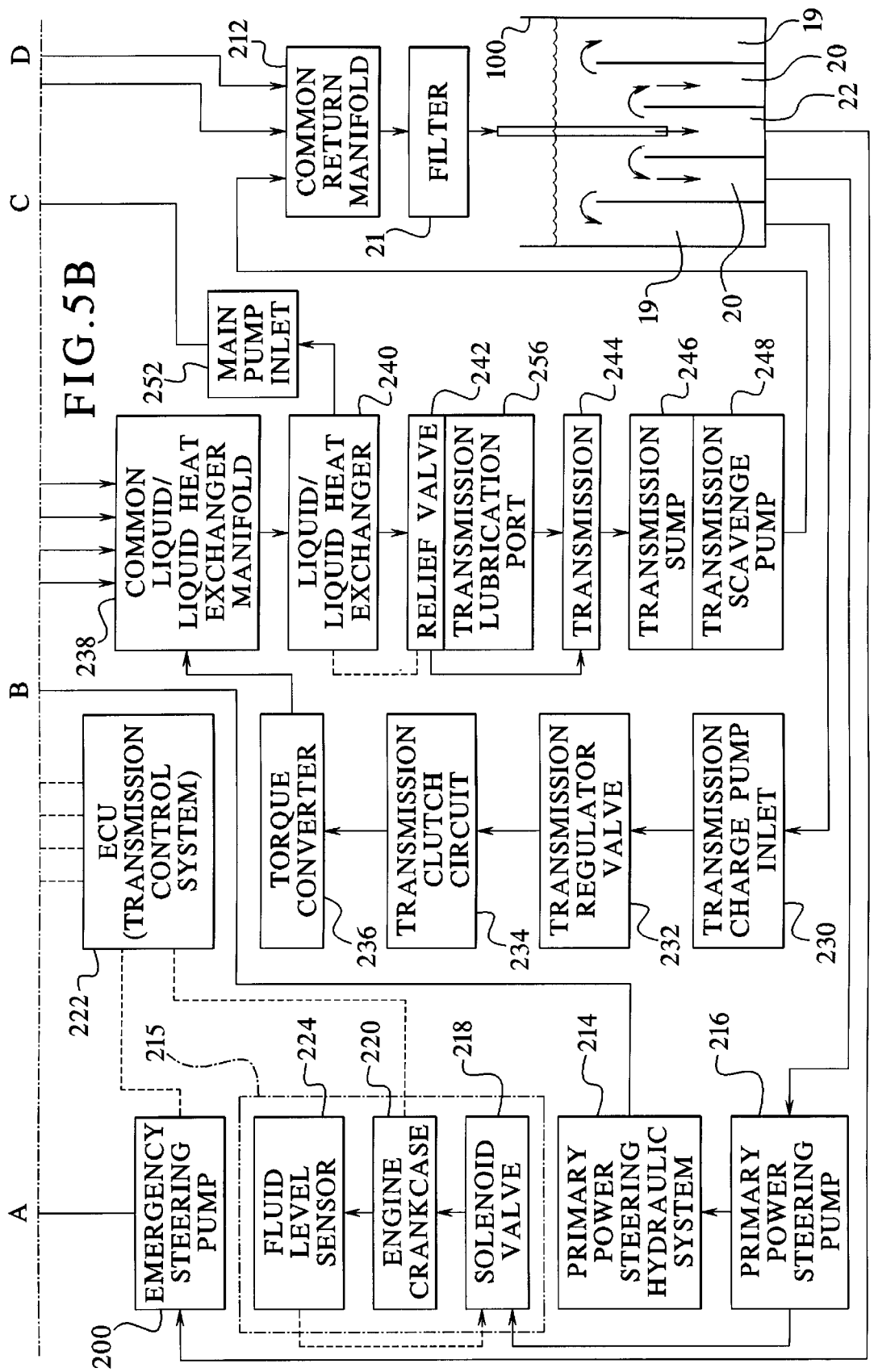
FIG. 5 illustrates a black box diagram of FIGS. 5A and 5B.

The outlet ports 9, 12 and 15 may be positioned in the bottom 31 of the reservoir 100 to distribute fluid from the appropriate volume 22, 20 and/or 19 to the hydraulic system (s) generally illustrated in FIGS. 5A and 5B.

A site-glass level gage 7 (such as Model IU940 manufactured by Lube Devices Incorporated, Manitowoc, Wisconsin) and/or an electronic level sensor 5 (such as an ultrasonic sensor Model PRS-401A manufactured by Migatron Corporation, Woodstock, Illinois) may be installed in the wall of the reservoir 100 and the dome lid 23, respectively. The site-glass level gage 7 and/or the electronic level sensor 5 may permit local monitoring or remote monitoring of the single-fluid level in the reservoir 100. Monitoring the single-fluid reservoir 100 level may represent the level for all shared hydraulic and remote systems.

Referring now to FIGS. 5A and 5B, a flowchart of an embodiment of the method for the fluid distribution and delivery system with three different potential circuits is illustrated. In the illustrated example, fluid from the volume 22 is preferably given first priority and supplies critical hydraulic requirements, such as emergency steering, for example. When a system demands fluid from the volume 22, fluid flows from the volume 22 to the demand, such as, for example, an emergency steering pump 200 (such as a pump Model PV29 manufactured by Denison Hydraulics, Marysville, Ohio). Fluid under pressure from the emergency steering pump 200 may flow to an emergency steering hydraulic system 210. Following use and exhaust of the fluid from the emergency power-steering elements, the fluid may be returned to the volume 22 through a common return manifold 212 (such as a manifold Model HO 90081624S manufactured by DAMAN Products Company, Mishawaka, Ind.). After returning to the volume 22 through the common return manifold 212, the fluid may pass through the return filter 21 and return to the reservoir 100.

Fluid returning to the reservoir may flow through the return filter 21 into the volume 22. In the event of hydraulic failure or fluid loss, a first priority system, as discussed above, may have immediate access to any fluid returning to the reservoir 100 before delivery of the fluid to the volumes 19 and 20 in addition to the fixed volume of fluid contained in the volume 22. The fixed volume of fluid contained in the volume 22 is fluid that mixes or is shared with the whole reservoir 100 yet is isolated to the volume 22. Additionally, a first priority system may access fluid at a level above the partitions 30 between the volume 19 and the volume 22.

Similarly, fluid from the volume 20 may be given second priority. The volume 20 preferably has second access or second priority to fluid returning to the reservoir 100 which may be available after the demand from the volume 22 is satisfied. In the embodiment shown in FIGS. 5A and 5B, the volume 20 may supply the primary steering hydraulic system 214. A second priority fluid may be supplied to an inlet of the primary power-steering pump 216 (such as Model 194DAO1H06-01-LA manufactured by Danfoss Corporation, Nordberg, Denmark). The fluid may then be delivered to the primary power-steering hydraulic system 214. Following use and exhaust of the fluid, fluid flows through the common return manifold 212. The fluid may then combine with fluid from other systems before returning to the reservoir 100. Fluid returning to the reservoir 100 may flow through the filter 21 into the volume 22.

In the event of hydraulic failure or fluid loss, the first and second priority systems preferably receive the first and second opportunity, respectively, to utilize fluid returning to the reservoir 100 before delivery to the volume 19. In addition, the first and second priority systems may utilize the fixed volume contained in the volume 20. Further, the second priority system may access fluid at a level above the partitions 30 between the volume 22, 20 and 19.

In a further embodiment of the second-priority circuit shown in FIG. 5A, an optional "top-off" circuit 215 is shown. The "top-off" circuit 215 may deliver fluid from the primary steering pump 216 to a normally closed solenoid valve 218 (such as a valve Model 74WH401 manufactured by Danfoss Corporation, Nordberg, Denmark) which may be connected to a non-circulating system such as, for example, an engine crankcase 220. Fluid delivered from the "top-off" circuit 215 may be consumed without returning to the reservoir 100. Top-off fluid delivery may be controlled by the ECU 222, an operator, mechanically or otherwise. In the embodiment shown in FIG. 5A, a known fluid level sensor 224 inside the engine monitors fluid level. When the fluid level is low, an electronic signal, analog signal, or other signal may cause the solenoid valve 218 to activate delivery of fluid to the engine crankcase 220.

As further illustrated in FIGS. 5A and 5B, fluid from the volume 19 may be given tertiary priority. Third-priority fluid may be delivered to an inlet of a transmission charge pump 230 (such as a pump manufactured by Tyrone Pump Cornith, Miss.). The transmission charge pump 230 may deliver fluid to a transmission regulator valve 232 where fluid may be distributed to a transmission clutch circuit 234 and then a torque converter 236. Fluid leaving the torque converter 236 may flow through a common liquid/liquid heat exchanger manifold 238 combining with fluid returning from a main pump 250 (retarder, fan motor and auxiliary circuit) and may pass through a liquid/liquid heat exchanger 240 (such as an exchanger Model CS-1736-90522 manufactured by American Industrial Heat Transfer Incorporated, Racine, Wis.). A pressure control valve 251 or a pre-set relief valve 242 (such as a valve manufactured by Full Flow Corporation, Blanchester, Ohio) located in a transmission lubrication port 256 preferably maintains a minimum pressure in the circuit of the main pump inlet 252.

Fluid from the liquid/liquid heat exchanger 240 may be distributed in two paths. In one path, the fluid may pass through a relief valve 242 to supply the transmission 244 before returning to a transmission sump 246 where fluid may be drawn through a transmission scavenge pump 248 (such as a pump manufactured by Tyrone Pump, Cornith, Miss.), and pumped through the common return manifold 212, onto the filter 21 and into the reservoir 100.

In the second path, fluid from the liquid/liquid heat exchanger 240 may be maintained at a minimum pressure set by the relief valve 242 through the filter of the main pump inlet 252 (such as a filter Model FAL511-CC10-N24/F32-15-E-A manufactured by Fairey Arron Company, Sturtevant, Wis.) to an inlet of the main pump 250 (such as a pump Model P05 manufactured by Denison Hydraulics, Marysville, Ohio).

The main pump compensator circuit optionally includes a solenoid valve 253 that is normally closed or compensator unloader valve 261 (such as Model 74WH401 manufactured by Danfoss Corporation, Nordberg, Denmark) to vent compensator pressure during engine starting to prevent the main pump compensator from reacting and applying a torque load during cranking or until the engine is started. The solenoid valve 253 is closed after engine starting to permit normal main pump compensator operation. Main pump pressure is available to the retarder flow control valve 257 and auxiliary hydraulic systems 255 beyond "set" circuit pressure of the fan motor 259 using a PWM (pulse-width-modulated) pressure control valve 251 (such as Model VP01 manufactured by Denison Hydraulics, Marysville, Ohio) located in the main-pump compensator circuit. The pressure compensator sense line of the main pump 250 is installed before the inlet of the fan motor 259 (such as Model M5B manufactured by Denison Hydraulics, Marysville, Ohio). Opening the pressure control valve 251 modulates the pump compensator increasing the delivery pressure at the outlet of the main-pump 250.

In an embodiment, the main pump 250 preferably performs four functions: 1) cooling fan motor hydraulic supply; 2) transmission retarder; 3) auxiliary hydraulic supply; and 4) hydraulic fluid and engine coolant heater.

Figure 6:
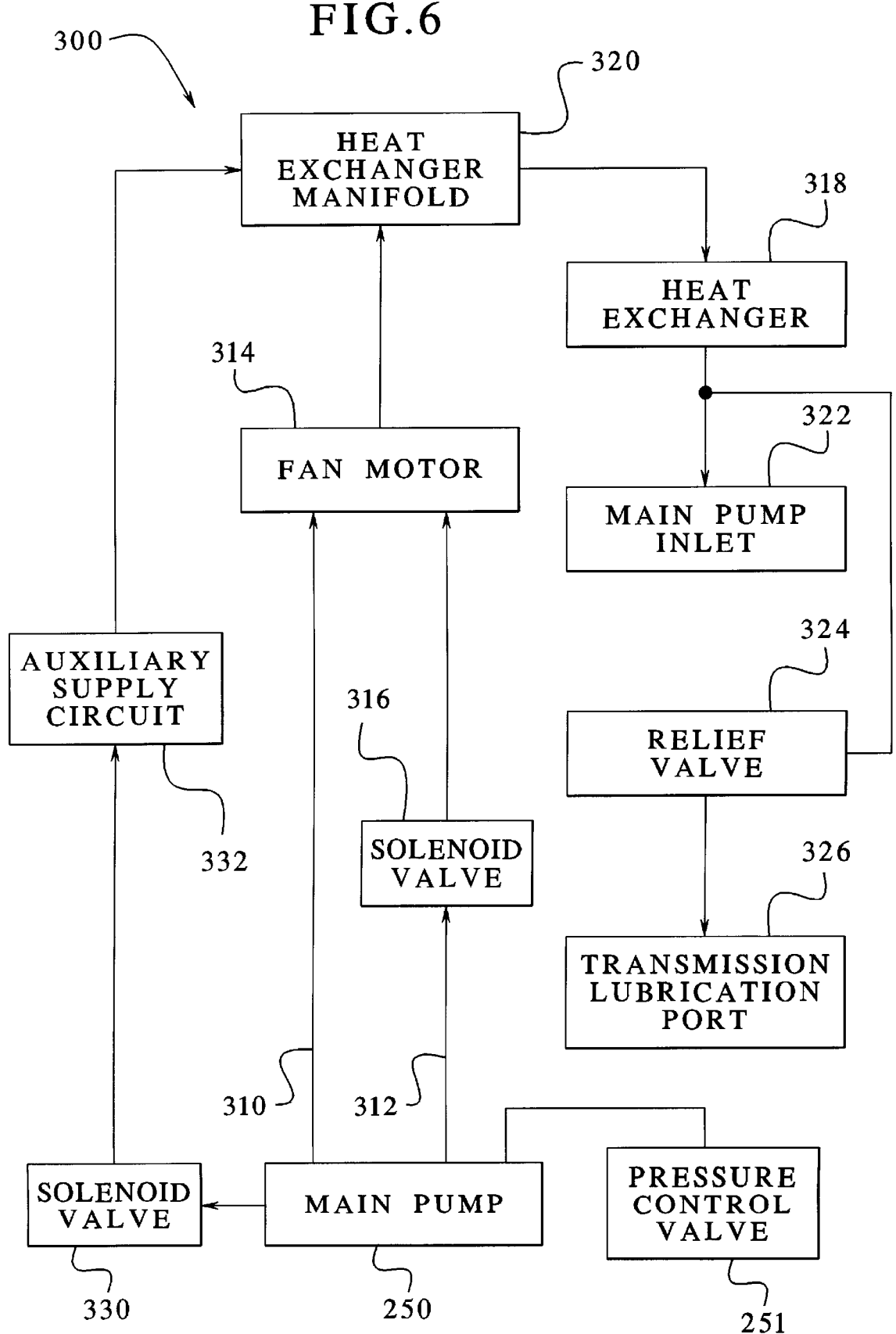
FIG. 6 illustrates a flowchart of two different functions served by a main pump in an embodiment of the present invention.

The function of the main pump 250 as a cooling fan motor hydraulic supply is generally illustrated in FIG. 6. When used, a hydraulic powered cooling fan provides air flow over the vehicle cooling system heat exchanger to reject engine heat, transmission heat and other heat. It is often necessary to regulate fan speed to maintain correct engine temperatures with changing ambient conditions and vehicle load. The fan-drive motor supply circuit may employ a regulating valve that selects a single speed, two-speed, multiple speed or proportional speed. FIG. 6 illustrates an example of a two-speed fan circuit 300.

The two-speed fan circuit 300 preferably includes two legs: a low speed leg 310 supplying fluid to the fan motor continuously, and a high speed leg 312 that, when open, supplies additional fluid for high-speed fan operation. As also illustrated in FIG. 5B, each of the legs 310, 312 contain a pressure-compensated, flow control valve (such as valve Model FR1A-30-H4D manufactured by Snap-Tite Corporation, Union City, Pa.) to regulate pressure to permit setting the fan speed. The low speed leg 310 may supply fluid directly to the fan motor 314. The high speed leg 312 may contain a normally open solenoid valve 316 (such as valve Model R34V manufactured by Denison Hydraulics, Marysville, Ohio).

When the solenoid valve 316 is powered or closed, the fan motor 314 turns at low speed. When the solenoid valve 316 is unpowered or open, the high speed leg 312 supplies fluid to the fan resulting in high-speed fan operation. In the event of an electrical failure, the high-speed solenoid valve 316 may open, and the fan motor 314 preferably activates to high-speed to provide maximum air flow through the primary vehicle heat exchanger 318. Fluid exhausted from the fan motor 314 may then flow to the heat-exchanger return manifold 320, through the heat exchanger 318, onto the main pump inlet 322, through a preset relief valve 324, and then to the transmission lubrication port 326.

Figure 10:
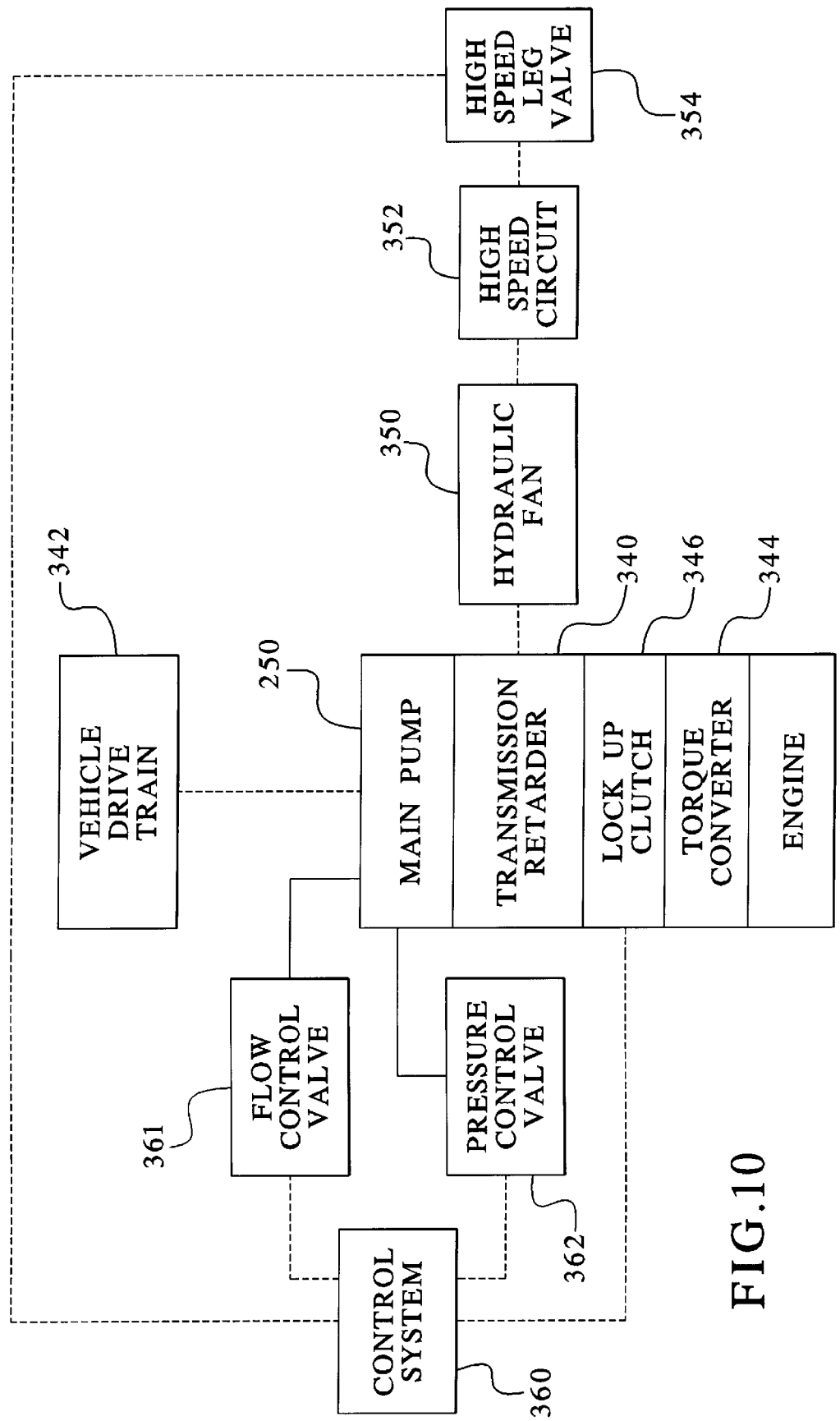
FIG. 10 illustrates a flowchart of a transmission retarder function of a main pump.

Another function of the main pump 250 is the performance of the transmission retarder. The transmission retarder function of the main pump 250 is generally illustrated in FIG. 10. A transmission retarder 340 may absorb power from a vehicle drive-train 342 to slow vehicle motion, such as when descending through a long grade. In this embodiment, one function of the main hydraulic pump 250 is to serve as a transmission retarder 340. In vehicles equipped with a torque converter 344, the transmission retarder and/or transmission control may activate the lock-up clutch 346 of the torque converter 344. That is, the torque-converter 344 may be fixed mechanically to rotate with the engine flywheel before, during or simultaneously with a command for retardation. The transmission retarder 340 and/or transmission controller 340 and/or the operator may "downshift" or "up-shift" the transmission ratio to control input speed from the vehicle drive-train 342.

When the operator and/or control system signals for retardation, the main hydraulic pump 250 may respond in three progressive steps to absorb energy from the vehicle drive-train. First, in vehicles equipped with a hydraulic fan drive, a hydraulic fan 350 may be signaled to open a high-speed circuit 352. In this case, a high-speed leg valve 354 may be opened to provide fan flow. In a system with proportional fan control, the fan speed may be opened in proportion to the operator's desired level of retardation. The hydraulic fan 350 may use pressurized fluid from the outlet of the main pump 250 to rotate the fan. Drive-train energy used to operate the main pump 250 is absorbed doing work with the fan. Operating the fan at high speed may simultaneously provide maximum air-flow through the vehicle primary heat exchanger for maximum heat rejection.

Second, if the operator and/or the control system 360 requests additional retardation, the controller and/or control system 360 may modulate the PWM (pulse width modulated) pressure control valve 362 (such as valve Model VP01 manufactured by Denison Hydraulics Corporation, Marysville, Ohio) located in the compensator circuit of the main pump 250. The main pump 250 may maintain pressure as signaled through a sense line. As the main pump outlet pressure increases, the main pump 250 may work to increase and to maintain higher and higher outlet pressure. The main pump 250 may absorb energy from the drive-line in proportion to pump flow and pressure until maximum set operating pressure is reached.

Finally, after having reached the maximum pump operating pressure, the operator and/or control system 360 may signal for additional retardation. The operator and/or control system 360 may then begin to modulate the PWM (pulse width modulation) flow control valve 361 (such as Model F5C manufactured by Dension Hydraulics, Marysville, Ohio). This will normally open a direct acting modulating restrictive pressure compensator (such as compensator Model LPHC-XHN manufactured by Sun Hydraulics Corporation, Sarasota, Fla.) downstream from the outlet of the main pump 250. The main pump 250 may react to supply the downstream load at the maximum operating pressure until the maximum pump flow and pressure is reached. This is the maximum retardation available from the retarder circuit.

A relief valve (such as valve Model R5V manufactured by Denison Hydraulics, Marysville, Ohio) located downstream from the flow control valve 361 may be set to less than a maximum operating pressure of the system to prevent too much fluid flow or "over-shoot" and subsequent drop in operating pressure. Fluid temperature may rise as mechanical pump work is converted to heat. Then, the hot fluid may flow to the heat-exchanger return manifold, through the heat exchanger, onto the main pump inlet filter, to the inlet, through a preset relief valve, to the transmission lubrication port.

Referring again to FIG. 6, the auxiliary hydraulic supply function of the main pump 250 is also generally illustrated. When the retarder is not operating, fluid under pressure from the outlet of the main pump 250 may continue to satisfy the cooling fan circuit. A normally closed solenoid valve 330 (such as valve Model R4V manufactured by Denison Hydraulics, Marysville Ohio) may be opened to permit fluid flow to the auxiliary supply circuit 332. Auxiliary fluid flow may be used to power vehicle systems. Fluid exhausted from auxiliary systems then may flow to the heat-exchanger return manifold 320, through the heat exchanger 318, onto the main pump inlet 322, though a preset relief valve 324, and then to the transmission lubrication port 326.

Pressure available to auxiliary systems may be controlled using the same proportional pressure control valve 362 (such as Model VP01 manufactured by Denison Hydraulics, Marysville Ohio) as shown in FIG. 10. The pressure control valve 362, located in the main pump compensator circuit, may be used to control pressure during retarder operation. Pressure control may enable the supply circuit to tailor fluid delivery for differing auxiliary hydraulic system pressure requirements.

Figure 7:
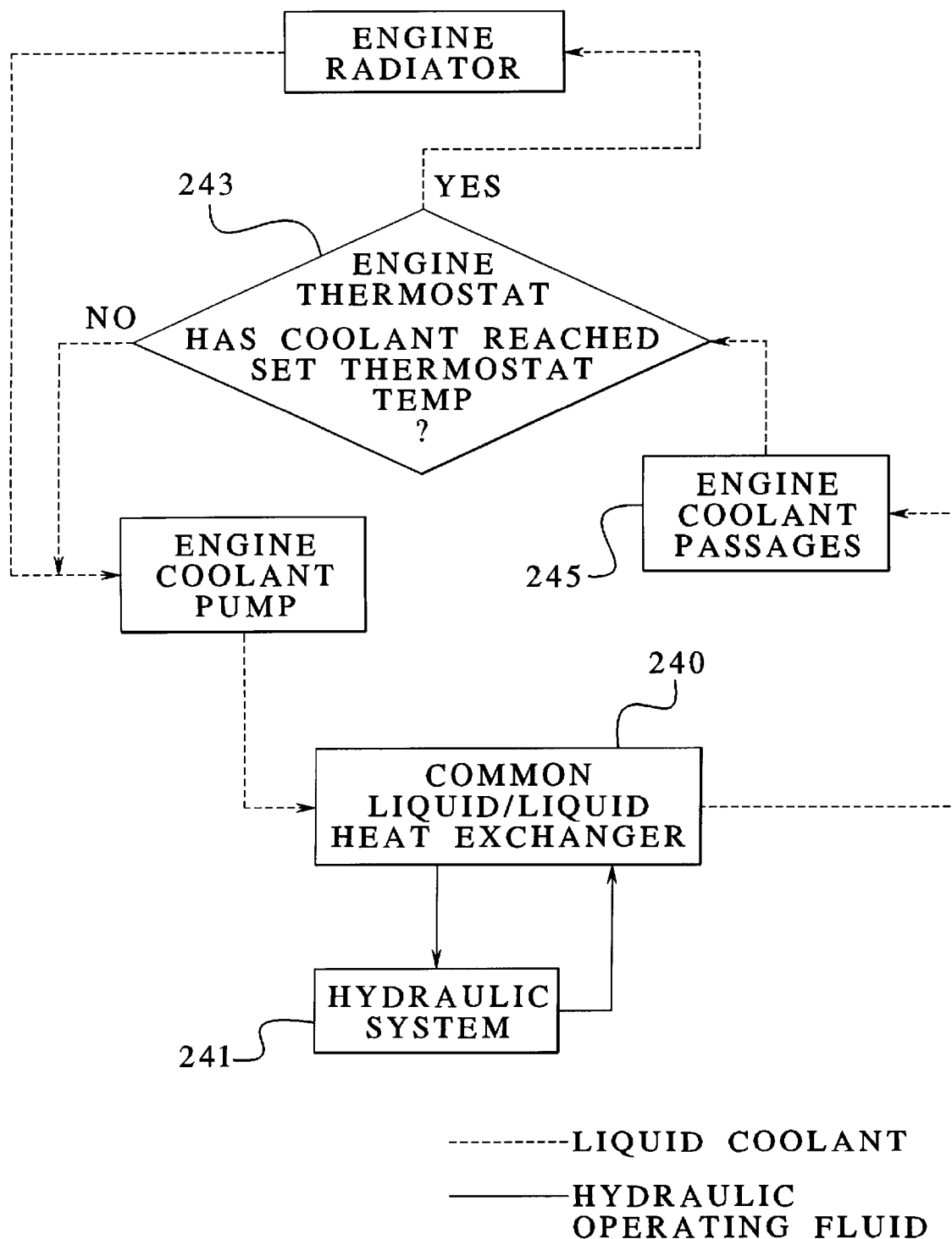
FIG. 7 illustrates a flowchart of a coolant function in an embodiment of the present invention.

The hydraulic fluid and engine coolant heater function of the main pump 250 is generally illustrated in FIG. 7. Liquid-coolant circulates through the engine cooling system and the common liquid/liquid heat exchanger 240. Hydraulic operating fluid circulates through the common liquid/liquid heat exchanger 240 and the hydraulic system 241. Heat may be exchanged from the hydraulic operating fluid to the liquid-coolant, from the coolant to the hydraulic operating fluid or exchange no heat at all dependent on the temperature gradient across the common liquid/liquid heat exchanger 240. Hydraulic operating fluid and liquid-coolant temperatures may be regulated by the engine cooling system. That is, the hydraulic system temperature regulation is integral with the engine coolant temperature control. Before the engine thermostats open 243, engine coolant is circulated by the engine water-pump through the common liquid/liquid heat exchanger 240 and engine coolant passages 245 until the coolant temperature is high enough to open the engine thermostats 243 permitting the engine coolant to circulate primary flow through the primary heat exchanger to the water-pump. From the water pump, the primary flow circulates through the heat exchanger, through the engine coolant passages 245, through the engine primary heat exchanger and back to the water-pump.

Fluid from the main pump combines with fluid from the torque converter before passing through a common liquid-to-liquid heat exchanger. Cooled fluid may be distributed back to the main pump and into the transmission lubrication circuit. Fluid passing through the heat exchanger may reject heat to the engine coolant when the hydraulic fluid temperature is greater than the temperature of the engine coolant. The engine coolant rejects heat to the fluid when the temperature of the engine coolant is higher than the fluid temperature. The thermal relationship may permit the engine to act as a hydraulic system fluid heater and the hydraulic system as an engine heater across the heat-exchanger dependent of the temperature gradient. In each case, the engine thermostat may serve to regulate both the engine coolant and hydraulic fluid operating temperatures. This permits simultaneous, rapid warm-up and temperature maintenance for both engine coolant and hydraulic fluid.

Maintaining a consistent hydraulic fluid temperature may improve vehicle performance though consistent fluid viscosity, improved lubrication, reduced wear, consistent transmission shift quality, consistent power-steering performance and accelerated water removal. The hydrostatic retarder mounted at the torque converter and driven at a constant ratio to engine speed, may normally be applied to decelerate vehicle motion by absorbing energy from the rotating drive-train. The absorbed mechanical energy may be largely converted to heat and in-turn rejected to the operating fluid.

A hydrostatic retarder (main pump) may operate independent of vehicle motion. That is, the retarder may absorb engine power when the vehicle is not moving as long as the engine is running. In frigid conditions, particularly at start-up, the main pump retarder may be used to generate heat and raise hydraulic fluid and engine coolant temperature. With the engine running, the main pump may be activated to load the engine, identical with retarder operation, by manipulating the pressure control valve in the main pump compensator sense line and the downstream flow control valve.

Engine mechanical power may be converted to heat and subsequently rejected to the hydraulic fluid. This heat may be, in turn, rejected to the engine coolant. An optional thermally regulated bypass valve (such as valve Model 20-10 manufactured by Fluid Power Engineering) may be located at the liquid-to-liquid heat exchanger inlet. During start-up at low ambient temperatures, it may be necessary to bypass the heat exchanger to avoid the high flow restriction and resulting high pressures associated with passing cold, high-viscosity fluid through a heat exchanger. When the fluid reaches a pre-set relief valve temperature, fluid may pass though the heat exchanger to reject or to absorb heat to/from the engine coolant.

With engine thermostats closed, the warmed coolant may circulate through the engine water jacket and system heat exchanger until the coolant temperature is sufficient to open the engine thermostat. Coolant may then pass into the primary engine heat exchanger. The main pump (retarder) may be turned-off when an acceptable operating temperature is reached. Heat generation may be compounded as the engine is forced to rotate the retarder pump. The additional heat may be rejected into the engine water jacket and surrounding components causing the system temperature to rise more rapidly. System/engine heater operation may be monitored and/or controlled through an ECU. System/engine heater operation may be monitored with temperature sensors located at well known locations in the cooling system and/or in relation with other quantities. System/engine heater operation may also be monitored with sensors such as vehicle system air-system pressure and/or transmission shift selection and/or hydraulic system temperature and/or others.

Figure 8:
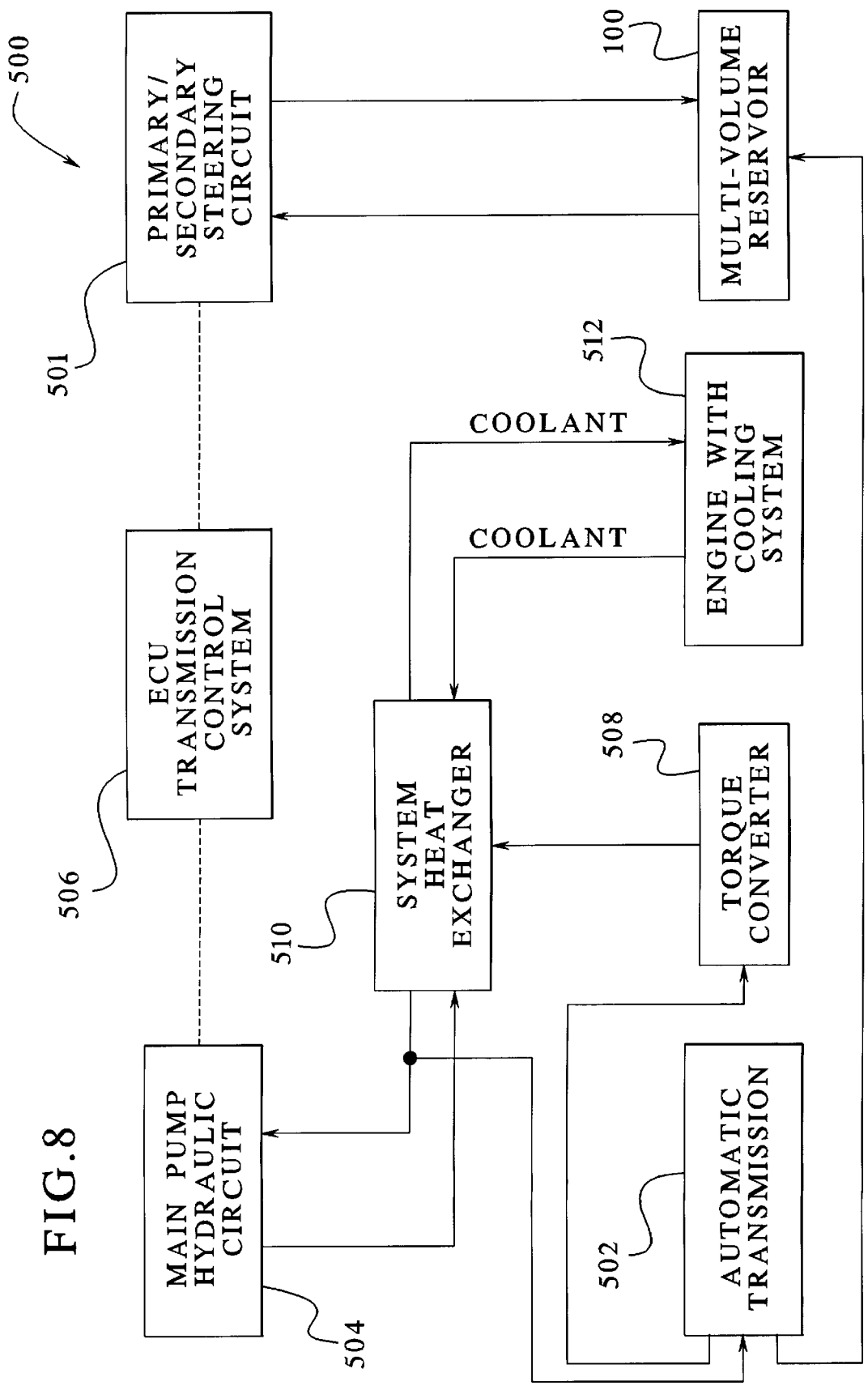
FIG. 8 illustrates a flowchart of multiple circuits and a multiple-volume reservoir in an embodiment of the present invention.

Referring now to FIG. 8, a flowchart of multiple circuits with a multiple-volume reservoir is shown, representing, in a preferred embodiment, the single-fluid hydraulic system 500. The flowchart in FIG. 8 is an overview of the preferred embodiment of the present invention. As discussed above, a single fluid supplies all vehicle power and lubrication fluid requirements to a number of systems which may include a primary/secondary steering circuit 501, a automatic transmission system 502 and a main pump hydraulic circuit 504. The ECU (Transmission Control System) 506 may control the main pump hydraulic circuit 504 and the primary/secondary steering circuit 501. Fluid may be provided to the automatic transmission system 502 and then to a torque converter 508 as described. Fluid leaving the torque converter 508 may flow through a system heat exchanger 510 combining with fluid returning from the main pump hydraulic circuit 504 (see also FIGS. 5A, 5B and 7). Fluid from the system heat exchanger 510 may flow to the main pump hydraulic circuit 504 or to the engine with cooling system 512.

Figure 9:
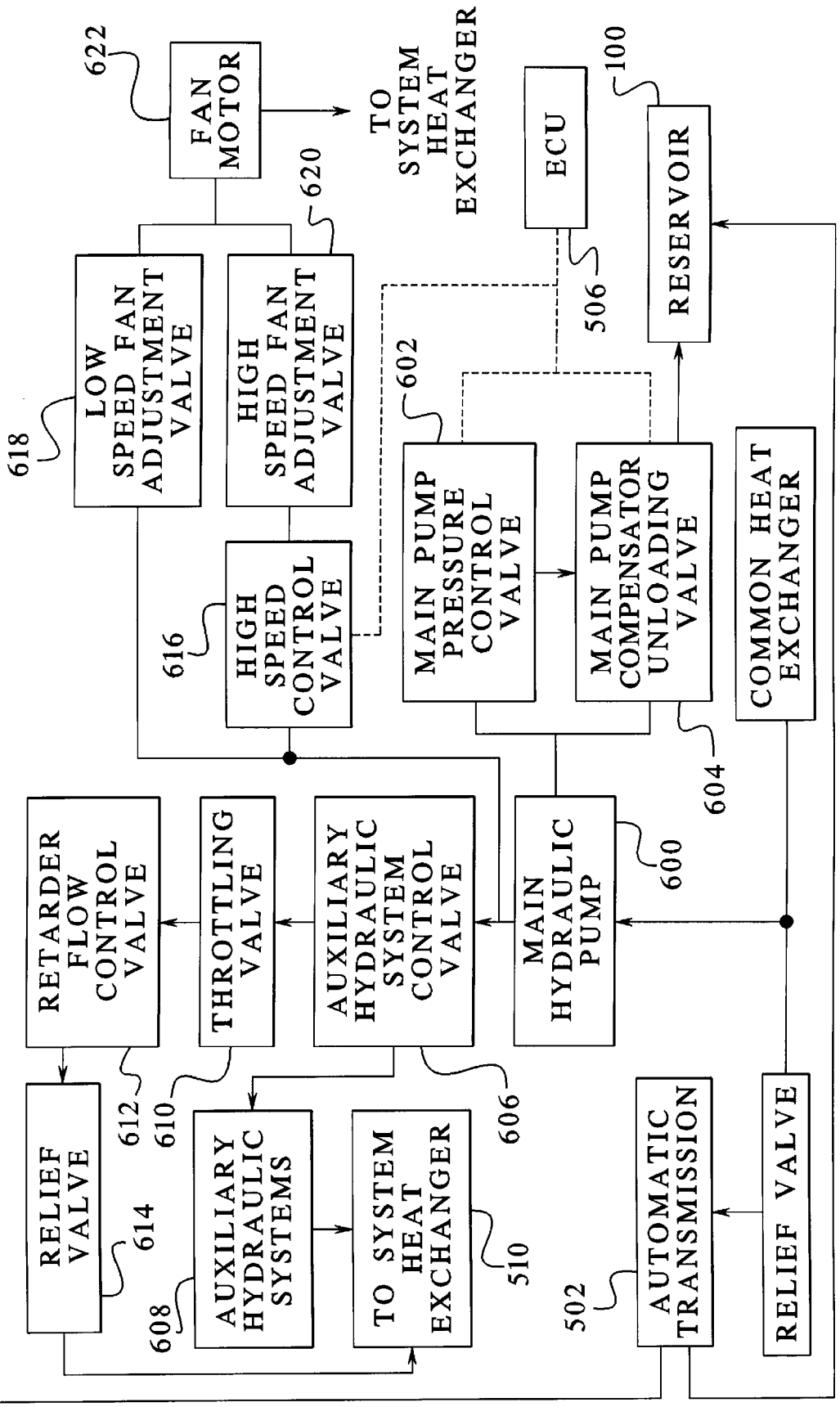
FIG. 9 illustrates a flowchart of a main pump hydraulic circuit in an embodiment of the present invention.

Referring now to FIG. 9, a flowchart of the main pump hydraulic circuit 504 (as shown in FIG. 8) is illustrated in an embodiment of this invention. More specifically, FIG. 9 shows a more detailed overview of the main pump hydraulic circuit 504 as discussed above and how it is related to the ECU 506, the automatic transmission 502, the system heat exchanger 510, and the reservoir 100 as shown in FIG. 8. Included in the illustration is a main hydraulic pump 600, a main pump pressure control valve 602, a main pump compensator unloading valve 604, an auxiliary hydraulic system control valve 606, an auxiliary hydraulic system 608, a throttling valve 610, a retarder flow control valve 612, relief valve 614, a high speed control valve 616, a high speed fan adjustment valve 620, a low speed fan adjustment valve 618, and a fan motor 622. All of the different elements are discussed in further detail and/or illustrated in the drawings.

In a preferred embodiment, the single-fluid hydraulic system 500 may be filled with an operating fluid (such as, for example, DELVAC 1 motor oil manufactured by Exxon Mobile Corporation). The operating fluid may permit operation over a wide ambient temperature range without changing the operating fluid and may have a high miscibility with other fluids, a high inherent viscosity index, wide compatibility and other well-known qualities. The single-fluid system may operate with any fluid compatible with system components.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for distribution and delivery of a fluid, the method comprising the steps of:

providing a reservoir having a bottom and walls defining a volume;

providing a plurality of partitions having a top end and a bottom end wherein the bottom end is attached to the bottom of the reservoir;

creating a plurality of volumes by the division of the volume of the reservoir by the plurality of partitions;

providing a plurality of outlet ports wherein at least one of the plurality of outlet ports is located within each of the plurality of volumes;

providing a fluid inlet projecting into an innermost volume of the plurality of volumes; and providing a plurality of drains wherein at least one of the plurality of drains is located in the bottom of the container within each of the plurality of volumes.

2. The method of claim 1 further comprising the step of:
screening fluid within a reservoir.

3. The method of claim 1 further comprising the step of:
filtering fluid into the inner most volume of the reservoir.

4. The method of claim 1 further comprising the step of:
remotely monitoring level of the fluid.

5. The method of claim 1 further comprising the step of:
measuring temperature of the fluid.

6. The method of claim 1 further comprising the step of:
introducing the fluid into the reservoir through the inlet.

7. The method of claim 1 further comprising the step of:
preventing contamination of the fluid at the inlet to the reservoir using of a check valve wherein the check valve prevents the fluid from passing upward.

8. The method of claim 1 further comprising the step of:
mixing the fluid and removal of entrained air by centrifugal flow.

9. The method of claim 1 further comprising the step of:
mixing the fluid and removal of entrained air by fluid flow as a second-priority volume surrounding a first-priority volume receives the fluid from the first priority volume and further wherein a third-priority volume receives fluid that flows over a partition between the second priority volume and the third priority volume.

10. The method of claim 1 further comprising the step of:
distributing the fluid to a first priority circuit from a first priority volume and to a second priority circuit from a second priority volume and further to a third priority circuit from a third priority volume.

11. The method of claim 1 further comprising the step of:

recovering the fluid and returning the fluid to the reservoir.

12. An apparatus for a single fluid, multiple-volume, self-prioritized reservoir, the apparatus comprising:

a container having a bottom and walls defining a volume;

a plurality of partitions each having a top end and a bottom end wherein the bottom end of each of the plurality of partitions is attached to the bottom of the container creating a plurality of volumes in the container;

a plurality of outlet ports wherein at least one of the plurality of outlet ports is located within each of the plurality of volumes; and a fluid inlet projecting into an innermost volume of the plurality of volumes.

13. The apparatus of claim 12 further comprising:

a fine mesh screen positioned over the top end of the plurality of partitions.

14. The apparatus of claim 12 further comprising:

a lid fastened to the container.

15. The apparatus of claim 12 further comprising:

a return filter associated with the fluid inlet.

16. The apparatus of claim 12 further comprising:

a level site-glass gage installed in the wall of the container.

17. The apparatus of claim 12 further comprising:

an electronic level sensor installed in the lid.

18. The apparatus of claim 12 further comprising:

a temperature sensor installed on the container.

19. The apparatus of claim 12 further comprising:

a fluid that flows into the container.

20. The apparatus of claim 12 further comprising:

a second priority volume surrounding a first-priority volume wherein the second priority volume receives fluid from the first priority volume.

21. The apparatus of claim 12 further comprising:

a third-priority volume wherein the third priority volume receives fluid from a second priority volume wherein the fluid from the second volume passes over the top end of one of a plurality of partitions.

22. The apparatus of claim 12 further comprising:

a third-priority volume wherein the third priority volume receives fluid from a second priority volume wherein fluid from the second volume passes through a screen.

23. The apparatus of claim 12 further comprising:

a bottom plate with integral dividers wherein the bottom plate is fastened to the bottom of the container.

24. The apparatus of claim 12 further comprising:

a filler-neck located over a return filter wherein the filler-neck has a check valve to prevent fluid from passing through the filler-neck.

25. The apparatus of claim 24 further comprising:

a filler cap located above the filler-neck wherein fluid may be added to the container by removal of the filler cap.

26. A system for distribution and delivery of a fluid, the system comprising:

a reservoir having a bottom, a volume, and lid wherein the lid is fastened to the container;

a plurality of partitions having a top end and a bottom end wherein the bottom end is attached to the bottom of the reservoir;

a plurality of volumes created by the division of the volume of the reservoir by the plurality of partitions;

a plurality of outlet ports within each of the plurality of volumes;

a fluid inlet projecting into an innermost volume of the plurality of volumes; and a plurality of drains wherein at least one of the plurality of drains is located in the bottom of the container within each of the plurality of volumes.

27. The system of claim 26 further comprising:

a screening means positioned over the top end of the plurality of partitions at a plurality of outlet ports or other location.

28. The system of claim 26 further comprising:

a filter means wherein the fluid is filtered and directed into the inner most volume of the reservoir.

29. The system of claim 26 further comprising:

a fluid contamination prevention means wherein a filler-neck located over a return filter contains a check valve wherein the check valve prevents the fluid from passing upward through the filler-neck.

30. The system of claim 26 further comprising:

a mixing means wherein a second priority volume located surrounding a first-priority volume receives the fluid from the first priority volume and further wherein a third-priority volume receives the fluid from the second priority volume.

31. The system of claim 26 further comprising:

a distribution means wherein a first priority circuit receives the fluid from a first priority volume and a second priority circuit receives the fluid from a second priority volume and further wherein a third priority circuit receives the fluid from a third priority volume.

32. The system of claim 26 further comprising:

a fluid recovery means wherein the fluid is recovered and returned to the reservoir.

* * * * *